Dec. 29, 1953 P. W. CORNELL 2,664,337
FLUIDIZED FIXED BED PROCESS
Filed Aug. 25, 1950 2 Sheets-Sheet 1
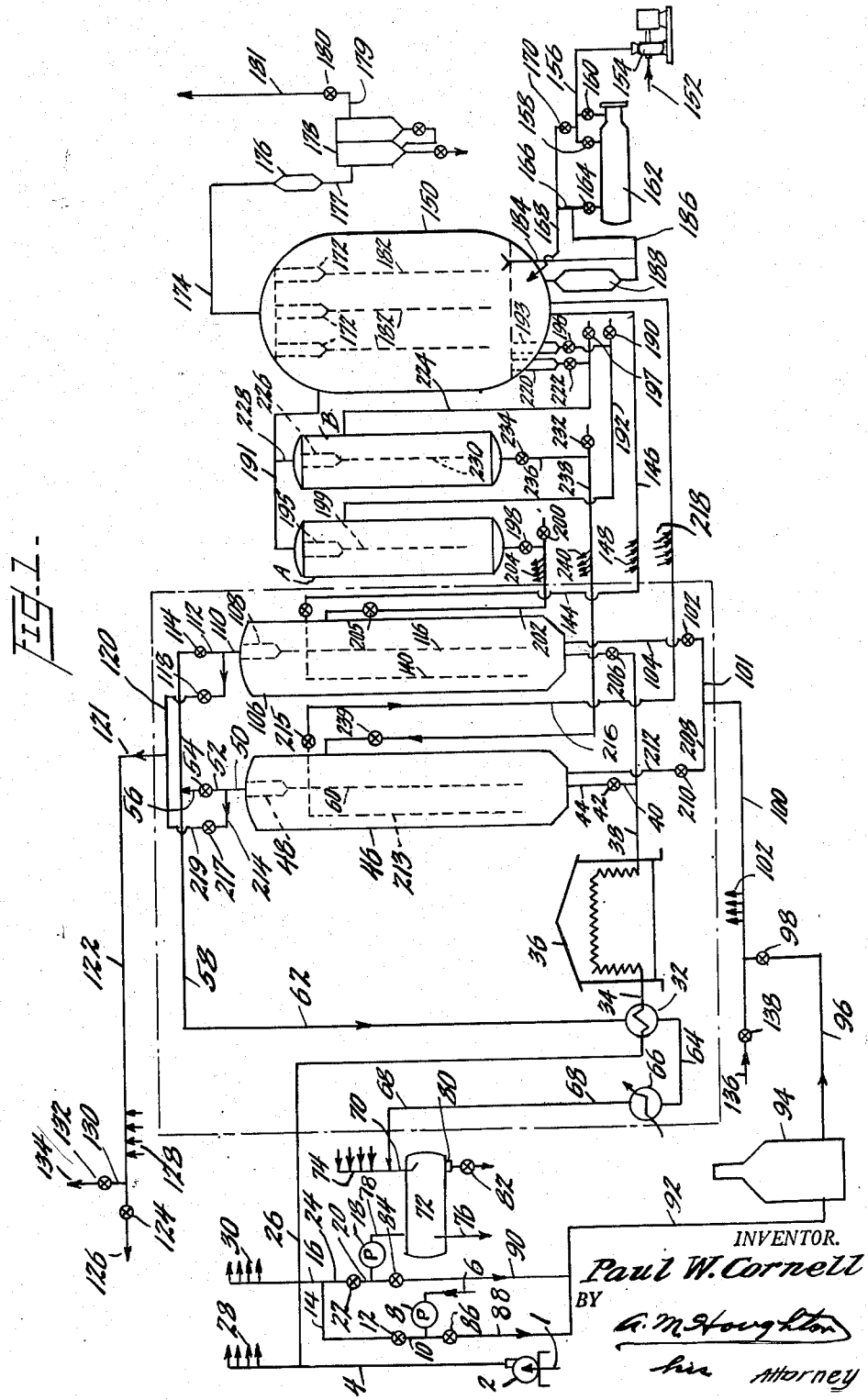
INVENTOR.
Paul W. Cornell
BY
G. M. Houghton
his Attorney Dec. 29, 1953   P. W. CORNELL   2,664,337
FLUIDIZED FIXED BED PROCESS
Filed Aug. 25, 1950   2 Sheets-Sheet 2
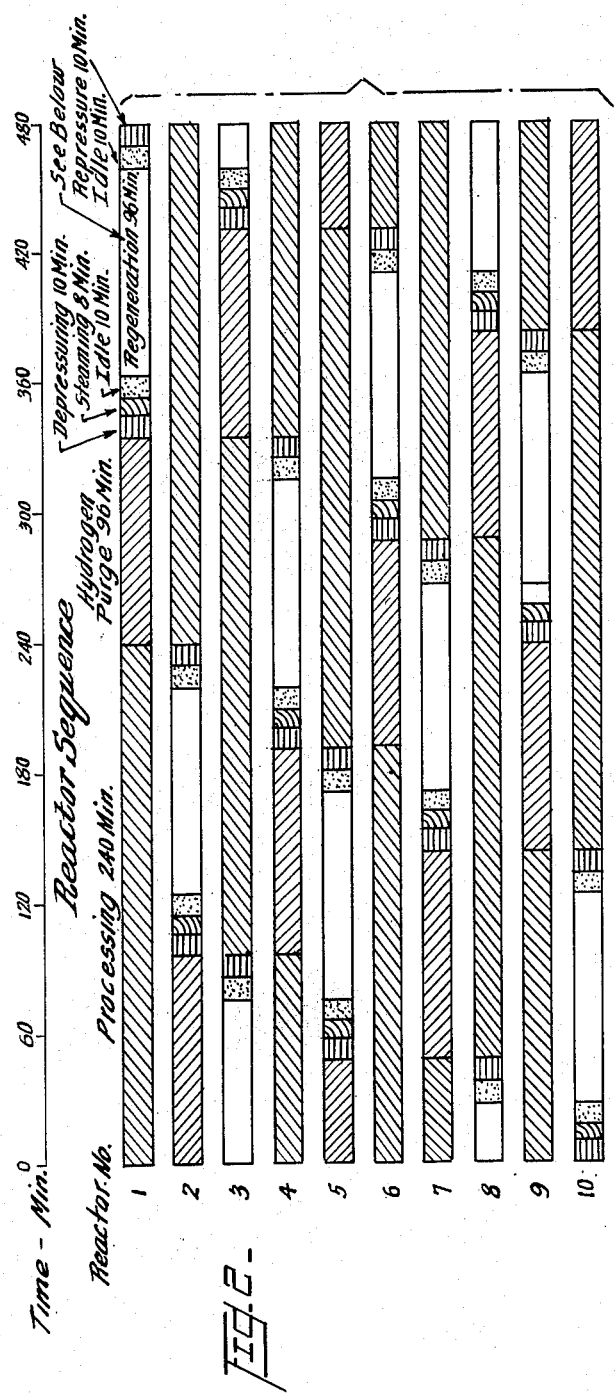
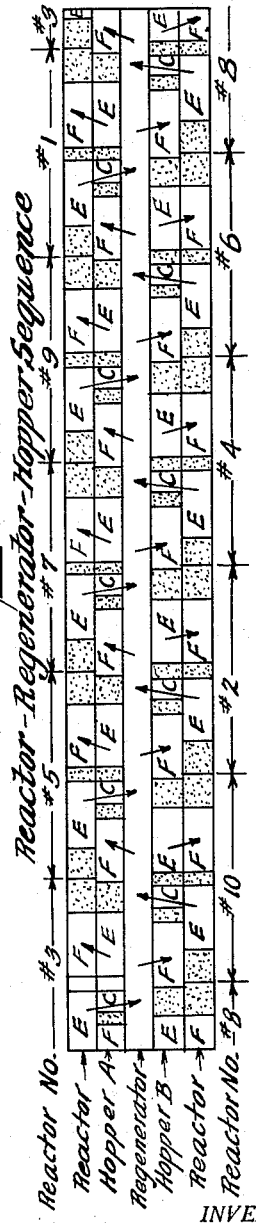
INVENTOR.
Paul W. Cornell
BY
Attorney Patented Dec. 29, 1953

2,664,337

UNITED STATES PATENT OFFICE 2,664,337

FLUIDIZED FIXED BED PROCESS

Paul W. Cornell, Mount Lebanon, Pa., assignor to Gulf Oil Corporation, Pittsburgh, Pa., a corporation of Pennsylvania Application August 25, 1950, Serial No. 181,432

2 Claims. (Cl. 23—1)

This invention relates to an improved fluidized fixed bed process for performing catalytic conversion reactions in which the heat balance ranges from approximately neutral to exothermic.

It has heretofore been known to carry out catalytic conversions by passing the reactants through a fixed or stationary bed of pelleted catalyst. This type of process is advantageous in that the regeneration is carried out in the same vessel as the reaction, and in that optimum conditions for both the reaction and regeneration phases of the cycle may be utilized. However, certain disadvantages are also present in the use of this type process, since the catalyst bed tends to become plugged by a carbonaceous deposit, said deposit filling the interstices between the catalyst pellets. Often this carbonaceous deposit, or coke laydown, as it is usually designated, is so great as to render passage of regenerating gases through the catalyst bed difficult, and in some instances so great as to render regeneration impossible. Also, this deposition of carbonaceous material tends to cause localized burning during the regeneration of the catalyst thus creating "hot spots" in the bed. Overheating of the catalyst particles tends to damage them and thus reduce the efficiency of the catalyst for further conversion reactions. Another disadvantage of the fixed bed type process is that temperature control is difficult during the reaction or on-stream phase of the cycle. A further disadvantage of this type process is that the nonproductive or off-stream time of the reactor is directly dependent upon the time required to regenerate the catalyst. In other words, a fixed bed reactor is out of service for the entire length of time required to burn off the carbonaceous deposit from the catalyst. If the coke laydown is large, the off-stream time may exceed the produtcive or on-stream period of the reactor. A further disadvantage of the fixed bed process is that optimum design of equipment may not be utilized. In other words, since a single vessel performs two functions, namely, that of a reactor and that of a regenerator, the final design must be a compromise between the optimum design for each individual vessel.

It has also been proposed to carry out catalytic conversion reactions in a reactor containing a fluidized moving bed of catalyst. This type of process is conventional and well understood; consequently, it suffices to state that finely divided catalyst particles are maintained in suspension within the reactor by the flow of reactants. This suspended catalyst bed is continuously renewed throughout the process by continuous transfer of a portion of the catalyst to and from a separate regenerating vessel. This process is considered superior to the fixed bed processes for certain purposes in that temperature control in the reactor is less difficult, no hot spots are developed during regeneration and no plugging of the bed occurs. However, one inherent difficulty in this type of process is that both reactor and regenerator must be operated at approximately the same pressure conditions, which may not be those most desirable for the respective operations.

Catalytic conversions have also been carried out using what has been called a fluidized fixed catalyst bed. In this type of process a finely divided catalyst is kept in suspension within the reactor by means of a flow of reactants therethrough, the catalyst bed being unrenewed (except for make-up catalyst) during the on-stream phase of the cycle. Regeneration is carried out within the reactor, when the catalyst becomes sufficiently deactivated. While this type of process is superior to the stationary bed process in that it produces better temperature control, and eliminates plugging of the bed, and while it is superior to the fluidized moving bed process in that the reaction and regeneration phases may be carried out at substantially different pressures, it is still subject to the disadvantages that a vessel of optimum design, with regard to both reaction and regeneration, is not employed. The fluidized fixed bed process also possesses the same inherent difficulty as the stationary bed process in that the non-productive or off-stream phase of the cycle is governed by the time required for the regeneration of the catalyst. A further difficulty of both the fluidized fixed bed and the stationary bed type processes, is experienced in providing a constant on-stream capacity, i. e., the ability to accommodate an unvarying flow of charge stock, since both processes are on-stream only intermittently.

It is an object of this invention to provide a fluidized fixed bed process in which the length of time that a reactor is off-stream is minimized. Another object of this invention is to provide a substantially continuous fluidized fixed bed process. It is another object of this invention to provide a substantially continuous fluidized fixed bed operation which will provide a constant on-stream capacity for treating charge stock. A further object of this invention is to provide a process, involving both on-stream and off-stream periods, in which the time of the off-stream period is divorced from the time required to regenerate the catalyst. Another object is to provide a process which will enable the employment of optimum design in the equipment. An object related to that immediately previous is to provide a process enabling utilization of optimum conditions during both reaction phase and regeneration phase. It is a further object of this invention to provide a process which may utilize a regenerator of minimum size for servicing a large number of reactors. Still another object is to provide a process in which regeneration is carried out continuously, thus eliminating the need for repeatedly starting up. Still another object of this invention is to produce a process in which a catalyst transport system of minimum size may be utilized, and in which the structure of the catalyst transport system is not dictated by the amount of heat to be added to the reaction. An additional object is to provide a process which will minimize investment cost for non-productive equipment, i. e., regenerating vessel, catalyst transport system, etc.

These and other objects are accomplished by my invention which comprises a process for catalytically promoting chemical reactions wherein the heat balance ranges from approximately neutral to exothermic, and in which the catalyst is reactivated by oxidation. The process includes the steps of effecting a complete on-stream cycle within a first reactor by introducing powdered refractory catalyst therein and maintaining the catalyst in a state of turbulent suspension within said reactor. The catalyst is contacted with a stream of reactant vapors under conditions of elevated temperature and pressure. Converted product is withdrawn while substantially all of the catalyst is retained within the reaction chamber. The on-stream cycle is terminated in the first reactor when the activity of the catalyst has been substantially reduced. A complete on-stream cycle is initiated in a second reactor. After termination of the on-stream cycle in the first reactor the reactor is depressured and a regeneration cycle is begun. The regeneration cycle includes removing the catalyst content of the first reactor to a regenerating zone, regenerating this catalyst by subjecting it to an oxidizing treatment at elevated temperature and at a substantially lower pressure than was employed in the reactor, and returning regenerated catalyst to the first reactor. A second on-stream cycle is then begun in the first reactor. The on-stream cycle is terminated in the second reactor when the activity of the catalys therein has been substantially reduced, whereupon this reactor undergoes a regeneration cycle similar to that described for the first reactor. After completing the regeneration cycle the second reactor is again placed on-stream. Certain modifications of my process may include any or all of the following expedients: continuous operation of the regenerator, putting a reactor back on-stream during at least part of the time its deactivated catalyst is being regenerated so as to minimize the off-stream time for each reactor, and maintenance of a constant on-stream capacity, i. e., maintenance of the same number of reactors on-stream at any given time.

Figure 1 presents a diagrammatic arrangement of an apparatus which may be utilized in one preferred modification of the invention.

Figures 2 and 3 are block diagrams illustrating one satisfactory switching sequence for the apparatus illustrated in Figure 1 when carrying out one of the conversion reactions to which the invention is applicable. Specifically, Figure 2 represents a switching sequence for the entire system, while Figure 3 represents the switching sequence for the regeneration phase alone.

In th following description, certain preferred modifications of the invention are set forth. It is to be understood that these are by way of illustration only and are not to be considered as limiting.

In general, my process is applicable to any catalytically promoted conversion reaction which has a heat of reaction varying from exothermic to approximately neutral and which is carried out at elevated pressure. The reason for the limitation as to the heat balance lies in the distinction between a fluidized fixed bed process and a fluidized moving bed process. In the latter the hot regenerated catalyst, continuously introduced into the reactor, provides a means for introducing external heat to an endothermic reaction. In the former type of process the catalyst bed is substantially unrenewed during the on-stream period. Consequently, the present process cannot be used to greatest advantage where large amounts of heat must be added to the reaction.

Examples of exothermic reactions to which this invention is applicable are: alkylation, hydrogenation of aldehydes, hydrogenation of phenols, and hydrogenation of carbon monoxide to methane. My invention is also useful in exothermic catalytic conversions of hydrocarbons. Examples of these reactions are non-destructive hydrogenation and addition reactions such as polymerization. My invention is equally applicable to processes having a heat of reaction which is substantially neutral. Examples of these reactions are those in which an exothermic reaction, such as one of those listed above, takes place simultaneously with and to a similar extent as an endothermic reaction, such as catalytic cracking, thereby providing a substantially neutral heat balance. Specific examples of these types of reactions are hydrocracking or destructive hydrogenation, and hydrodesulfurization. My invention is also applicable to certain endothermic catalytic processes which may be carried out in such a manner as to produce a substantially neutral heat balance, e. g., as by preheating the reactants to the necessary degree. Examples of endothermic reactions which may be operated in an approximately neutral heat balance region are hydroforming and catalytic reforming in the presence of hydrogen.

In its simplest form the process may be operated with two fluidized reactors, one fluidized regenerator and suitable transport lines. In this modification the first reactor may be put on-stream at a given time, while the second may be switched on-stream, for example, at some later time, either before or after the catalyst in the first reactor is ready to be regenerated. Advantageously, the second reactor may be put on-stream substantially at the same time the first reactor becomes ready for regeneration. When the catalyst of the first reactor becomes sufficiently inactive, passage of reactant therethrough is discontinued. The reactor is then depressured and purged to displace traces of reactant, and deactivated catalyst is conveyed to the regenerator.

If the regenerator is not operating already, it may be started up during catalyst transport, for example, in order that regeneration may begin as the catalyst is introduced into the regenerating vessel. At some time after the reactor has been emptied, which time may be immediately thereafter, after regeneration is complete, or some time in between, the catalyst flow is reversed and the emptied reactor is refilled, repressured and again placed on-stream.

The second reactor follows a similar cycle. Desirably, the cycles of the first and second reactors may be dovetailed so as to provide continuously one on-stream reactor.

Similarly my invention may involve the use of three, four or an even greater number of pressurized reactors in conjunction with a single regenerator operating at a substantially lower pressure. With a three reactor system, for example, a four hour on-stream period and a two hour regeneration period, the processing periods may be rotated so as to provide two on-stream reactors at all times as described in my copending application Serial No. 181,431, filed August 25, 1950.

In all of the modifications described above certain advantages may be obtained by maintaining an extra amount of catalyst in the regenerator. One such advantage is that the percentage of fluctuation in the regenerator bed may be reduced. Another advantage is that the activity level of the catalyst returned to the reactor may be improved. In this modification deactivated catalyst is introduced into a bed of catalyst undergoing regeneration, and at some time after the reactor is emptied (preferably as soon as possible thereafter) the flow is reversed and a charge of catalyst is conveyed from the regenerator to the empty reactor. In all cases, the presence of the extra catalyst in the regenerator serves to raise the activity level of the catalyst returned to the regenerator. This is true since this more active catalyst is mixed in with the less active catalyst which has just been removed from the reactor and may have undergone only partial regeneration.

One further desirable form of the invention involves continuous operation of the regenerator at relatively low pressure and with simultaneous operation of one or more of the reactors at relatively higher pressure. This modification requires periodic introduction of deactivated catalyst into the regenerator at such times as to provide enough contaminant to maintain combustion.

When extra catalyst is maintained in the regenerator the process may be operated so as to minimize the off-stream time for each reactor. This may be done by introducing a fresh charge of catalyst into the emptied reactor before regeneration of its deactivated catalyst is complete, i. e., the reactor is put back on-stream during at least part of the time its deactivated catalyst is being regenerated. Ideally the reactor is refilled and put back on-stream substantially as soon as it has been emptied.

It will be apparent, therefore, that in its simplest form my process may be operated with two or more pressurized reactors, serviced by a single regenerator operating at a substantially lower pressure. The regeneration may be carried out intermittently or continuously, extra catalyst may or may not be maintained in the regenerator, and the reactors may or may not be operated in such a manner as to provide a constant number of on-stream reactors. Desirably, the process may be operated so as to minimize off-stream time for the individual reactors.

The operation of one preferred form of the process may be described most easily with reference to accompanying Figure 1. This figure represents a suitable apparatus for carrying out my process as it applies to a preferred modification, hydrocracking, or a species of hydrocracking, hydrodesulfurization. The drawing, in general, represents an apparatus involving the use of 10 reactors (five banks of two reactors or two banks of five reactors), serviced by one regenerator. For convenience and clarity only one bank of two complementary reactors has been shown in the drawing, with the apparatus enclosed within the dashed line being utilized in quintuplicate.

In the operation of the illustrated apparatus, charge stock, which may be crude oil for example, is introduced into the system through line 1, pump 2 and line 4. At this stage the charge stock splits into five parallel streams. One-fifth of the charge stock passes into line 26; the other four-fifths pass into the four banks of two reactors (not shown), through parallel lines 28. One reactor in each two is on-stream at all times. Recycle hydrogen enters the system from high pressure flash drum 72, through line 78, pump 18, line 20, through valve 22, and into line 24. Fresh hydrogen, from a hydrogen producing unit (not shown), enters through line 6, pump 8, line 10, through valve 12 and into line 14. The fresh hydrogen is mixed with the recycle hydrogen in line 24 and the mixed stream passes into line 16. At this stage the fresh and recycle hydrogen are also split into five parallel streams, one-fifth of the gas joining the charge stock in line 26, with the remaining four-fifths passing to the four other banks of reactors (not shown) through parallel lines 30. The mixture of charge stock and fresh and recycle hydrogen pass through line 26 and through heat exchanger 32, where they undergo preliminary heating. From heat exchanger 32 the preheated mixture passes through line 34 to heater 36, where it is heated to reaction temperature. The mixture leaves the heater through line 38, passes into line 40, through valve 42, into line 44, and into reactor 46 which contains a bed of finely divided catalyst. The rate of flow of the reactants is such that the catalyst bed may be maintained in a state of turbulent suspension.

Advantageously, the degree of fluidization of the catalyst within the reactor may be much less than that normally encountered in conventional fluidized bed operation. By means of this expedient, the size of the reactor (and thus the cost thereof) may be reduced considerably while depth of conversion is increased. The savings in equipment are particularly appreciable in the case of reactions such as hydrocracking or hydrodesulfurization which are carried out at high pressure in thick-walled vessels. The converted reactants pass out of the reactor through cyclone separator 48 into line 50 and line 52, through valve 54, line 56, and into line 58. Advantageously, the bulk of the catalyst within the reactor is maintained in a relatively dense phase in the lower part of the vessel. Consequently, the converted reactants flowing out of the reactor are relatively free of catalyst, except for fines produced by attrition, with the bulk of the catalyst being separated in the disengaging space above the dense phase. These fines are separated from the converted product in cyclone separator 48 and are returned to the main catalyst bed through standpipe 60.

The converted product passes from line 58 into line 62, and through heat exchanger 32, where the hot product acts to preheat the charge stock and hydrogen entering the system. The partially cooled product passes out of heat exchanger 32 into line 64 and into cooler 66, where it is further cooled. From the cooler the converted reactants pass into line 68, line 70, and thence into high pressure flash drum 72. Numeral 74 represents the parallel streams of converted product from the four banks of reactors not illustrated in the drawing. In drum 72 the hydrogen contained in the product is flashed off through line 78, from which it re-enters the system as recycle hydrogen. Any water that is produced in the system is collected in trap 80 and may be drawn off through valve 82.

The liquid product in high pressure flash drum 72 passes out through line 76 to a low pressure flash drum and other conventional product recovery equipment not shown. Any hydrogen sulfide formed in the conversion process is flashed off from the low pressure flash drum along with other dissolved gases and may be separated from the latter in any conventional manner, such as absorption into a basic amine solution. The remaining liquid in the low pressure flash drum, may then be split into the desired fractions.

The conversion of the hydrocarbons within the reactor is accompanied by coke laydown on the catalyst. When this carbonaceous deposit has become sufficiently great to deactivate the catalyst substantially, regeneration is carried out. In the illustrated apparatus this is accomplished by closing valve 42 and switching the flow of reactants through valve 206 into the complementary reactor 106 of the pair, this vessel containing active catalyst. Reactor 46 is then hydrogen purged by passing recycle hydrogen through valve 84, line 90 and into line 92. Whatever fresh or make-up hydrogen is necessary may be added from the hydrogen producing unit through valve 86 and line 88. The fresh and/or recycle hydrogen are preheated to the temperature required for purging in heater 94 and passed into line 96 through valve 98 into line 100. Lines 102 lead to the four banks of reactors not shown, and are utilized individually when the reactors in these banks are ready for hydrogen purging. From line 100 the purge hydrogen passes into line 208, through valve 210, into line 212, and into reactor 46. Purging temperatures may be of the order of the reaction temperature or higher.

The hydrogen purge step in a hydrocracking or hydrodesulfurization process has several functions. One function is to sweep the remaining reactants and converted product out of the reactor. Another function is to effect a further hydrogenation of unconverted or incompletely converted charge stock. Still another function is to hydrogenate a portion of the coke deposited on the catalyst into useful liquid products. In addition, a portion of the coke which is not converted to liquid product may undergo a certain amount of hydrogenation and therefore may be more easily burned off in the regenerator. Hydrogen purging is not essential to the process and may be omitted if desired. In such cases the coke would be removed during regeneration only.

When the catalyst and reactor are sufficiently purged, the reactor is blocked off by closing valves 210 and 54, and the reactor is depressured through line 50, line 214, valve 217, line 219, line 121, and into line 122. From line 122 the depressured gases and liquid products pass through valve 124, line 126, and into the low pressure flash drum and other product recovery equipment (not shown). Numeral 128 refers to the lines parallel to line 121 and leading from the other four banks of reactors.

After depressuring, the reactor is steam purged to remove vestigial hydrogen and hydrocarbons remaining in the reactor and in the catalyst bed. This is accomplished by introducing steam into line 136 through valve 138 into line 100, through line 208 and valve 210, into line 212 and into the reactor 46. The steam and purged materials pass out of the reactor through cyclone separator 48 into line 50, into line 214, and thence into line 122. From line 122 the gas passes through line 130, valve 132 and line 134 to a vent.

At the completion of this step, valve 217 is closed, valve 215 is opened and steam flow is continued into the reactor at a rate sufficient to blow the catalyst out of the reactor through line 213, through valve 215, and into line 216. Numeral 218 refers to four parallel catalyst transport lines leading from the non-illustrated four banks of reactors. From line 216 catalyst passes into regenerator 150 which contains a bed of fluidized catalyst undergoing regeneration.

For starting up the regenerator, air is introduced through line 152, pump 154 and into line 156. A portion of the compressed air is diverted from line 156 and through valve 160 to supply air for the burner. The remaining portion of the air from line 156 passes through valve 158 into air heater 162, where it is heated to a temperature sufficient to ignite the carbon on the deactivated catalyst. From heater 162 the air passes through valve 164, into line 166, and into line 168. From line 168 the heated air enters the regenerator 150. Since regeneration is exothermic, the air heater may be blocked off by closing valves 158, 160 and 164, after combustion has been commenced in the regenerator, and opening valve 170 to permit unheated air to pass directly to the regenerator.

Contaminants (which may include sulfur as well as carbon) are burned off the catalyst in the regenerator. The flue gas, containing a small portion of catalyst, passes out of the regenerating vessel through cyclone separators 172 and into line 174. A portion of the entrained catalyst is separated from the flue gas and returned to the main catalyst bed by way of standpipes 182. Flue gas is partially cooled in cooler 176, from which it passes through line 177 into Cottrell precipitator 178, where the last portion of catalyst fines is separated out. Catalyst-free flue gas leaves Cottrell precipitator 178 through line 179, through valve 180, and is exhausted through line 181.

In the presently described preferred form of the invention additional catalyst is maintained in the regenerator at all times in order to reduce percentagewise the amount of fluctuation or surging in the catalyst bed level during transfer operations and to allow substantially continuous functioning for the reactors. Undue fluctuation is to be avoided in order to minimize or eliminate undesirable pressure fluctuations tending to upset the system. The amount of catalyst over and above that necessary for return to the reactors and maintained in the regenerator may vary quite widely. The minimum should be such as to reduce the percentage of fluctuation or surge substantially. The maximum is governed only by economic considerations as to the size of the regenerating vessel. In the presently described preferred modification the regenerator is of a size sufficient to contain three charges of catalyst, or two charges more than are necessary for return to a given reactor. By means of this expedient, fluctuation at most would amount to 33⅓%. As will be seen hereinafter in the particularly described preferred switching sequence, this fluctuation can be further reduced by simultaneously withdrawing and introducing catalyst into the regenerating vessel during a portion of the catalyst transport period.

In order to prevent damage to the catalyst particles through overheating, a cooling means is provided in combination with the regenerator. Hot catalyst at the bottom of the regenerator continuously passes out of the vessel through line 184. A portion of the air from line 168 is diverted through line 166 and line 186 in order to force the catalyst at the bottom of line 184 through the cooler 188 and back into the regenerator.

After transfer of the deactivated catalyst has been completed from reactor 46 to regenerator 150, the flow is reversed by opening valves 232 and 234. Steam is introduced into line 236 through valve 232 and serves to convey reactivated catalyst from previously filled hopper B through line 238 and valve 239 into reactor 46.

Hopper B, one of a pair of such vessels, is filled from regenerator 150 by opening valves 222 and 197 and introducing steam into line 224 through valve 197. Reactivated catalyst passes from collector 220 through line 224 into hopper B. Filling of the hopper is initiated prior to emptying of reactor 46, and the latter portion of its filling period overlaps the first portion of the emptying period of reactor 46. Numeral 240 denotes parallel lines to the other four reactors serviced by hopper B.

These hoppers operate alternately, and in the presently described preferred modification, each hopper serves one bank of five reactors. The functions of hopper B and its companion hopper A are two-fold. The first of these is to measure the exact amount of catalyst necessary for one charge to a reactor. The second function is that of cooling the catalyst. Since the regeneration is carried out at a temperature substantially above that employed in the reactor, the hot catalyst must be cooled before returning to the reactor for reuse in an on-stream phase. This may be accomplished advantageously, for example, by introduction into the hopper of water and an inert carrier gas as an atomizing medium. The water is then vaporized and serves to cool the catalyst. The inert gas, if desired, may be carbon dioxide and supplied from the hydrogen producing plant. The catalyst is maintained in fluidized form within the hopper by the flow of gases. Purged flue gas and cooling gases pass out of the vessel through cyclone separator 226, into line 228, through line 191 and into the regenerating vessel. The bulk of any catalyst particles carried along with these gases and not separated in the disengaging space is separated in cyclone separator 226 and returned to the main body of catalyst through standpipe 230.

It is obvious that these hoppers, while preferred, are not essential to the invention. When operating without such vessels, reactivated catalyst is introduced into the reactors directly from the regenerator, after the reactor has been emptied. Advantageously, a cooler is employed in the regenerator-reactor line in this modification in order to lower the temperature of the hot catalyst to approximately reaction temperature.

When the transfer from hopper B to reactor 46 is complete, the reactor is repressured with fresh and recycle hydrogen from line 100, through line 208, through valve 210, into line 212, and into reactor 46. At this point the catalyst in reactor 106 is sufficiently deactivated to require regeneration. Therefore, the flow of charge stock and hydrogen is switched from reactor 106 to reactor 46 by closing valve 206 and opening valves 42 and 54.

When reactor 106 is on-stream, the flow of reactants is similar to that through reactor 46, with charge entering the reactor through valve 206 and then into the catalyst bed. Cyclone separator 108 and standpipe 116 operate similarly as their corresponding elements in reactor 46. The flow of converted reactants from reactor 106 is through line 110, line 112, valve 114 and into line 58, from which it follows the course described for converted product leaving reactor 46.

As stated previously, the catalyst contained in reactor 106 has been sufficiently deactivated to require regeneration. Accordingly, it now undergoes a similar sequence of steps as was described for reactor 46. The catalyst is subjected to hydrogen purge from line 100 through line 101, through valve 102, into line 104, and into reactor 106. The purge hydrogen and converted product pass through cyclone separator 108 and into line 58 from which they pass to product recovery equipment in a manner similar to that described with regard to reactor 46.

At the completion of the hydrogen purge the reactor is blocked off by closing valves 102 and 114 and is depressured through line 126 by way of valve 118, lines 120, 121, and valve 124, and through the low pressure flash drum (not illustrated). At the end of the depressuring step, valve 98 is closed and steam is passed through lines 136, 100, 101 and 104, and into the reactor similarly as for reactor 46.

After this transfer is complete, reactivated catalyst is transported from previously filled hopper A by opening valves 198 and 209. Steam is introduced through valve 200 and serves to convey cooled, reactivated catalyst from hopper A through line 202 and valve 205 into reactor 106. Numeral 204 refers to parallel lines leading to the other four reactors serviced by hopper A. As in the case of hopper B, filling is initiated prior to transfer of deactivated catalyst from reactor 106 to regenerator 150, with the latter portion of the hopper's filling period overlapping the first portion of the reactor's emptying period.

Catalyst is transported to hopper A by opening valves 196 and 199. Steam is introduced into line 192 through valve 199, and catalyst from collector 193 passes through valve 196 and into line 192. From line 192 the catalyst enters hopper A, whose functions are as those described for hopper B.

When reactor 106 has been refilled, complementary reactor 46 has been on-stream for a period of time sufficient to deactivate the catalyst substantially. Accordingly, reactor 106 is repressured through valve 98 and line 100 similarly as was reactor 46, and the flow of reactants is switched from reactor 46 to reactor 106. The cycle is then repeated.

The overall scheme of operation for the ten reactor system may be explained most readily by reference to Figures 2 and 3. Figure 2 shows a time scale above a block diagram which sets forth the reactor sequence. For convenience, the ten reactors in this figure and in Figure 3 have been designated by numbers 1 through 10. The time scale has been correlated with the reactor sequence diagram, in order that the operations in any reactor may be determined at any given time.

An inspection of the block diagram shown in Figure 2 will illustrate that the processing time for reactor 1 comprises two hundred forty minutes on-stream and ninety-six minutes for hydrogen purging, while the regeneration period totals ninety-six minutes. Depressuring and repressuring consume ten minutes each while steam purging is completed in eight minutes. An idle period of ten minutes has been allowed at either end of the regeneration period. The sequence for each reactor is similar.

The general system of operation is that five reactors are on-stream at any given time, while the remaining five reactors are at some other phase of operation. For example, at time zero reactors 1, 4, 6, 7 and 9 are on-stream, while reactors 2, 3, 5, 8 and 10 are at some other phase of operation. Of the latter group, reactors 3 and 8 are actually in some portion of the regeneration period of ninety-six minutes. It will also be seen that the on-stream periods of the various reactors are staggered in such a manner that only one of the ten reactors goes off-stream at one time. Accordingly, the activity level of the catalyst contained in each of the on-stream reactors is at a progressively decreasing degree. In this manner, a minimum sized regenerator and catalyst transport system may be utilized. Of the ten reactors, reactors 1 and 2 constitute a complementary pair; reactors 3 and 4 constitute a similar complementary pair, and so on. This will be clearly seen from a comparison of processing periods for the complementary pairs of reactors.

Referring now to Figure 3, the block diagram illustrated represents the switching sequence carried out during each ninety-six minute regeneration period. This block diagram is correlated with Figure 2 and the time scale, so that each ninety-six minute regeneration period in Figure 2 is directly above the corresponding portion of Figure 3. The regenerator switching sequence in Figure 3 is believed to be self-explanatory. Therefore, it will be sufficient to point out several of the more important features.

Of interest is the fact that hopper A provides catalyst for reactors 1, 3, 5, 7 and 9, while hopper B operates in conjunction with reactors 2, 4, 6, 8 and 10. When reactor 1, for example, starts emptying into the regenerator, hopper A has completed about one-half of its refilling from the regenerator, and continues to fill during the first half of the emptying period of reactor 1, thus decreasing the aforementioned fluctuation of catalyst bed in the regenerator.

Considering the hopper sequence, there is provided a six minute switching and idle period, after which the cooling described above proceeds for ten minutes. Another six minute switching and idle period follows. The cycle is regulated so that emptying of the reactor 1 and the cooling of the hopper A are carried out simultaneously. After the six minutes allowed for the switching and variations in the cycle, hopper A empties into reactor 1. After another idle period to allow for variations in the preceding operation, switching and the like, hopper A then proceeds to refill and reactor 3 undergoes the sequence described for reactor 1. Since for regeneration purposes, the plant has been divided into two banks of five reactors, it will be seen that a similar sequence of operation is also being conducted for hopper B and the even numbered reactors. This sequence is staggered so that the emptying of one hopper is proceeding at approximately the same time as the filling of the other hopper.

A considerable amount of idle time has been incorporated into the switching sequence ahead of each basic operation to permit a safeguard against upsets in the preceding operation.

While there is catalyst flow into the regenerator for a period of thirty minutes, the sequence that follows involves flow out of the regenerator for thirty minutes to the hopper serving the opposite bank of five reactors. A reactor from this bank begins emptying into the regenerator during the latter portion of the hopper filling period. In other words, there is a substantial overlap between the flow to a hopper out of the regenerator and the flow to the regenerator from a reactor in the bank served by the hopper. Because of the manner in which the two banks are staggered there is flow into and out of the regenerator simultaneously, or an overlapping between the flow of a reactor and the flow of a hopper in the same bank for a period of fourteen minutes. This expedient serves to reduce fluctuation in the regenerator and avoids undue mixing of active and inactive catalyst.

The diagram illustrates that the regenerator operates continuously, with catalyst being transported into and/or out of the vessel at all times except for switching lags.

It is obvious that the invention is not limited to any particular number of reactors. The principal considerations necessary with respect to the number of reactors, where continuous operation of the regenerator is desired, are that this number is sufficient to provide a substantially constant on-stream capacity for processing charge stock and that the number is sufficiently great that reactors may go off-stream often enough to provide for continuous operation of the regenerator. The intervals at which the reactors go off-stream are, of course, related to the amount of coke laydown and catalyst activity. In a process not requiring regeneration at the frequent intervals described in the proposed switching sequence, a proportionally larger number of reactors could be serviced by a single regenerator. Such a process could also be operated with a larger percentage of reactors on-stream at one time.

Reviewing briefly some of the more outstanding features of the invention, it will be seen that vessels of optimum design may be utilized for both regenerator and reactor, since separate vessels are employed. It should also be remembered that in an intermittent operation involving both on-stream and off-stream periods, the off-stream period is non-productive with respect to converted product. Consequently, it is always sought to reduce investment costs and time consumed for these non-productive steps. With these features in mind other important aspects of my invention may be pointed out more clearly.

One such aspect is that the off-stream period of the present process has been divorced from the time required for regeneration of the catalyst. Normally, it would be expected that the time consumed in catalyst removal and replacement operations would be equal to the sum of the times required for purging operations, catalyst transport, regeneration, switching, cooling, safety lags, depressuring, repressuring, and the like. In a preferred form of the present process it is not necessary to wait for complete regeneration of the catalyst, since a portion of the catalyst is continuously regenerated during the process of catalyst transport, and since extra catalyst charges are maintained within the regenerating vessel, thus serving to increase the average activity level of the catalyst withdrawn from the regenerator. Accordingly, operation of the individual reactor of the present process may be substantially continuous, except for catalyst substitution alone, that is, time consumed in catalyst transport, cooling, switching, purging and the like, and is not dependent on the time necessary for complete regeneration of the catalyst. This feature is extremely important in the operation of processes involving a substantial carbon laydown such as hydrocracking or hydrodesulfurization of heavy charge stock. This is true, since where coke laydown is large, the time required for complete regeneration of the catalyst may be so great as to exceed substantially the on-stream time of the reactor. Therefore, by catalyst substitution operations I mean the mechanical operations necessary to empty and refill the reactor, such as those listed above, without the inclusion of time necessary for complete regeneration, unless such is effected during catalyst transport.

Also it should be pointed out that by staggering the reactor sequence in the manner indicated, only one reactor charge of catalyst is required to be regenerated at any given time. As a result of this expedient a minimum sized regenerating vessel and catalyst transport system may be utilized. Thus the investment in equipment necessary for non-productive operation is proportionately decreased quite substantially.

In general, I contemplate using catalysts and working conditions usually employed by the art in connection with the specific type of process being carried out. These catalysts and conditions are well known, and therefore, it is not considered necessary to list them in detail. However, for the purpose of illustration, a few examples of catalysts which may be used in certain preferred modifications will be given. In one preferred modification of my invention where a hydrocracking process is carried out, examples of satisfactory catalysts are oxides of vanadium, chromium, tungsten, titanium, molybdenum and zirconium, preferably composited with a carrier to give the desired density and size for fluidized fixed bed operations. These catalysts are given merely by way of example; other catalysts known for the purpose may be used with equal facility.

I consider my process to be of particular value in connection with one species of hydrocracking, namely, catalytic hydrodesulfurization. Examples of satisfactory catalysts which may be employed as regards this reaction are heavy metal alumino-silicates, cobalt thiomolybdate, tungsten-nickel-sulfide, tungsten-iron-sulfide, nickel, nickel oxide, nickel sulfide, molybdenum oxide, molybdenum oxide-zinc oxide-magnesia, molybdenum oxide-chromium oxide, nickel-copper-alumina, molybdic oxide-nickelous oxide, molybdic oxide, copper oxide, cobalt molybdate, molybdic and tungsten sulfides, each preferably being composited with a carrier. Iron, nickel, cobalt, their oxides, chromates, molybdates, and tungstates are very satisfactory catalysts. Other catalysts known for this purpose may also be used.

In the instances set forth above the catalyst may be employed with a porous support or carrier (which may possess some catalytic activity) such as microspheres of silica-alumina cracking catalyst or powdered activated alumina or silica-alumina. Powdered silica gel, kieselguhr, and acid treated pumice are further examples of satisfactory supports. Other powdered synthetic carriers which may be used are silica-zirconia, silica-titania, alumina-titania, and silica-alumina-boric oxide. These synthetic carriers may be produced by coprecipitation or other conventional methods.

The composite catalysts may be made by impregnating the microspheres or other powdered carrier with a solution of a soluble salt of the metal, such as a nitrate, followed by drying and calcining, and followed by reduction, if a metal or a mixture of metal and oxide is to be used, or by sulfiding, if a sulfide catalyst is desired. Alternatively, the hydrogenating component may be coprecipitated with the carrier components.

The size of the catalyst particles may vary considerably, the only requirement being that it should be small enough to be suspended by the current of gas and vapor passed through the catalyst bed. However, it is necessary to employ catalyst particles which are not so small as to be carried along by the gas and vapor stream, if a non-transport type of operation is employed. Particles having a diameter falling between about 400 and 50 mesh are satisfactory. Most commercial catalysts are a mixture of particles having a variety of diameters, but these particles are almost entirely within the above diameter range. It is advantageous to use such mixtures, but mixtures containing large amounts of large or fine material, i. e., near or larger than 50 mesh or near or smaller than 400 mesh should be avoided.

The on-stream period for the individual reactor should be terminated when the activity of the catalyst has been substantially reduced. In connection with most of the catalysts listed above, the reduction of activity is due primarily to coke laydown. In some instances sulfiding of the metal or oxide compounds may occur. However, in most cases the sulfide is an effective catalyst. Oxidative regeneration operates to remove both contaminants and reactivate the catalysts.

The temperature range for processing operations in accordance with my invention varies depending upon the reaction involved, i. e., the temperatures used are those conventional for the particular reaction being carried out. For example, a reaction temperature range of between about 100° F. and about 600° F. is generally employed for non-destructive hydrogenation. Destructive hydrogenation, hydrocracking and hydrodesulfurization usually involve a temperature of between about 600° F. and about 1000° F. A temperature range of about 225° F. to about 650° F. is usually employed for polymerization reactions, the temperature varying according to the particular catalysts and pressures involved. As regards destructive hydrogenation (hydrocracking and/or hydrodesulfurization) of heavy charge stocks, temperatures between about 750° and 950° F. are most useful, and especially those between 800° and 870° F. However, lower or higher temperatures may be used.

My invention is useful for processes involving substantially different pressures in the reactor and regenerator. Since regeneration in the present invention is carried out in a different vessel, isolated from the on-stream reactor, it may be operated at a widely different pressure. Generally speaking, the pressure employed in the reactor may vary quite widely, from about 100 p. s. i. g. to about 3000 p. s. i. g. depending upon the particular reaction involved.

In reactions involving hydrogen treatment of hydrocarbons, the hydrogen to oil ratio may be varied over an extremely wide range, but it is desirably between about 300 and 20,000 s. c. f./bbl., (standard cubic feet per barrel). Ratios above about 1000 s. c. f./bbl. are useful in connection with the treatment of heavy charge stock. I have found that any hydrogen purity above about 50% produces satisfactory results, in modifications of my process which involve hydrocracking. In all instances the rates of flow of the reactants are correlated to produce fluidization of the catalyst bed.

Any reactants which exist in gaseous, vapor, or in mixed liquid-vapor form at reaction conditions may be employed, so long as they produce an approximately neutral to exothermic reaction or may be reacted at least at a substantially neutral heat balance.

As regards hydrocarbons, my invention is applicable to any charge stock, as long as it may exist in vapor or mixed liquid-vapor form at reaction conditions. My invention is particularly useful as applied to conversion of heavy charge stocks such as total, reduced or topped crude and especially those of low API gravity and high sulfur content. This is true, since my invention is adapted to economically process charge stock in a reaction involving the removal of relatively large amounts of contaminants from the catalyst.

Regeneration is carried out at a temperature sufficient to remove contaminants or otherwise restore the activity of the catalyst, but insufficient to cause damage to the catalyst particles by overheating. For example, a satisfactory temperature for burning off carbonaceous deposits may vary from about 850° F. to 1200° F. and preferably in the range of about 950° F. to 1150° F.

While regeneration under pressure is desirable from a rate standpoint, economical considerations and the mechanical difficulties involved presently indicate a preferred regeneration pressure of about 50 p. s. i. g., or less i. e., substantially atmospheric pressure.

The rate of flow of gas or vapor through the catalyst bed of either the reactor or regenerator may vary widely. In other words, the degree of fluidization may be the same or different in the two vessels. Advantageously, the degree of fluidization in the reactor is somewhat less extreme than that normally employed in fluidized beds and in the regenerator. This procedure allows the utilization of a smaller, less expensive, reactor, particularly in connection with heavy-walled pressure vessels.

One advantage of my invention is that it provides a substantially continuous fluidized fixed bed process. Another advantage is the provision of a substantially continuous fluidized fixed bed operation which will provide constant on-stream capacity for processing a non-varying flow of charge stock. One other advantage is the provision of a process, involving both on-stream and off-stream periods, in which the time of the off-stream period is not governed by the time required for regeneration of the catalyst. I have also provided a process which will enable utilization of optimum vessel design for both the regenerator and the reactor. Related to this advantage is the fact that optimum conditions for each operation may be utilized in the regenerator and the reactor.

I have also provided an advantageous process which enables employment of a catalyst transport system and a regenerator of minimum size, both servicing a large number of reactors. A further advantage is that I have provided a system of carrying out continuous regeneration thus eliminating the need for repeatedly starting up. One other important advantage of my process is that investment costs for non-productive equipment, i. e., catalyst transport lines, regenerating vessel, etc., have been reduced substantially.

What I claim:

1. An approximately continuous process for contacting reactants which have an approximately neutral to exothermic heat balance with a fluidized catalyst, which includes carrying out the process under pressure in a plurality of reactors, intermittently terminating the reaction, treating the catalyst with hydrogen under pressure to partially remove carbonaceous material deposited thereon and regenerating the catalyst contained in each of the reactors in a single, continuously operated regenerator at a substantially lower pressure, said process comprising passing the reactants through a plurality of reactors at elevated temperature and pressure, each of which reactors contains a fluidized, fixed bed of catalyst, the beds of catalyst being of progressively decreasing activity, terminating said passage through the reactor containing the least active catalyst bed when the catalyst therein requires regeneration, passing hydrogen under pressure through the reactor in which the reaction has been terminated until a substantial amount of carbonaceous material has been removed from the catalyst, terminating the flow of hydrogen, depressuring the reactor, removing catalyst from the depressured reactor, converging this catalyst to a continuously operated regenerator which contains a fluidized bed of the catalyst which is undergoing oxidative regeneration at a substantially lower pressure than exists in the reactors during the reaction period, removing active catalyst from the regenerator, conveying this active catalyst to the reactor from which the catalyst was removed, repressuring the reactor, again placing this repressured reactor on-stream and repeating the termination, hydrogen treatment, depressuring, catalyst removal, catalyst replacement and repressuring steps on each reactor in succession at such times as the catalyst therein becomes sufficiently inactive to require regeneration, the time of said termination of passage through a reactor and the number of reactors serviced by said regenerator being such that there is a substantially uniform flow of reactants through the reactors which are on-stream and a substantially uniform flow of hydrogen successively directed to successive reactors during the treatments with hydrogen under pressure after the on-stream reaction has been terminated and such as to provide, during the off-stream periods, a substantially uniform flow of catalyst to the regenerator.

2. An approximately continuous process for contacting reactants which have an approximately neutral to exothermic heat balance with a fluidized catalyst, which includes carrying out the process under pressure in a plurality of reactors, intermittently terminating the reaction, treating the catalyst with hydrogen under pressure to partially remove carbonaceous material deposited thereon and regenerating the catalyst contained in each of the reactors in a single, continuously operated regenerator at a substantially lower pressure, said process comprising passing the reactants through a plurality of reactors at elevated temperature at a pressure between about 100 and 3,000 p. s. i. g., each of which reactors contains a fluidized, fixed bed of catalyst, the beds of catalyst being of progressively decreasing activity, terminating said passage through the reactor containing at least active catalyst bed when the catalyst therein requires regeneration, passing hydrogen under pressure through the reactor in which the reaction has been terminated until a substantial amount of carbonaceous material has been removed from the catalyst, terminating the flow of hydrogen, depressuring the reactor to atmospheric pressure, removing catalyst from the depressured reactor, conveying this catalyst to a continuously operated regenerator which contains a fluidized bed of the catalyst which is undergoing oxidative regeneration at substantially atmospheric pressure, removing active catalyst from the regenerator, conveying this active catalyst to the reactor from which the catalyst was removed, repressuring the reactor to between about 100 and 3,000 p. s. i. g., again placing this repressured reactor on-stream and repeating the termination, hydrogen treatment, depressuring, catalyst removal, catalyst replacement and repressuring steps on each reactor in succession at such times as the catalyst therein becomes sufficiently inactive to require regeneration, the time of said termination of passage through a reactor and the number of reactors serviced by said regenerator being such that there is a substantially uniform flow of reactants through the reactors which are on-stream and a substantially uniform flow of hydrogen successively directed to successive reactors during the treatments with hydrogen under pressure after the on-stream reaction has been terminated and such as to provide, during the off-stream periods, a substantially uniform flow of catalyst to the regenerator.

PAUL W. CORNELL.

References Cited in the file of this patent

UNITED STATES PATENTS

| Number | Name | Date |
| --- | --- | --- |
| 2,265,837 | Harding | Dec. 9, 1941 |
| 2,273,864 | Houdry | Feb. 24, 1942 |
| 2,356,717 | Williams | Aug. 22, 1944 |
| 2,417,164 | Huber | Mar. 11, 1947 |
| 2,434,537 | Barr et al. | Jan. 13, 1948 |
| 2,515,373 | Keith et al. | July 18, 1950 |
| 2,546,625 | Bergstrom | Mar. 27, 1951 |
| 2,585,238 | Gerhold | Feb. 12, 1952 |

FOREIGN PATENTS

| Number | Country | Date |
| --- | --- | --- |
| 383,616 | Great Britain | Feb. 13, 1931 |